United States Patent
Zhang et al.

(10) Patent No.: US 8,680,865 B2
(45) Date of Patent: Mar. 25, 2014

(54) SINGLE WELL RESERVOIR IMAGING APPARATUS AND METHODS

(75) Inventors: Tianhua Zhang, Al-Khobar (SA);
Mohammed Badri, Al-Khobar (SA);
Patrice Ligneul, Al-Khobar (SA);
Mahmood Akbar, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 620 days.

(21) Appl. No.: 12/727,501

(22) Filed: Mar. 19, 2010

(65) Prior Publication Data
US 2011/0227577 A1 Sep. 22, 2011

(51) Int. Cl.
*G01V 3/00* (2006.01)
*G01B 3/30* (2006.01)
*G01V 3/28* (2006.01)
*G01V 3/26* (2006.01)
*E21B 47/04* (2012.01)
*E21B 47/12* (2012.01)

(52) U.S. Cl.
CPC .. *G01B 3/30* (2013.01); *G01V 3/28* (2013.01); *G01V 3/26* (2013.01); *E21B 47/042* (2013.01); *E21B 47/12* (2013.01)
USPC .......................................................... 324/338

(58) Field of Classification Search
None
See application file for complete search history.

(56) References Cited

U.S. PATENT DOCUMENTS

| 3,944,910 A | 3/1976 | Rau |
| 4,297,699 A | 10/1981 | Fowler et al. |
| 4,430,653 A | 2/1984 | Coon et al. |
| 4,670,717 A | 6/1987 | Sender |
| 4,678,997 A | 7/1987 | Janes |
| 4,766,384 A | 8/1988 | Kleinberg et al. |
| 4,814,768 A | 3/1989 | Chang |
| 5,059,907 A | 10/1991 | Sherman |
| 5,132,623 A | 7/1992 | De |
| 5,168,234 A | 12/1992 | Freedman |
| 5,235,285 A * | 8/1993 | Clark et al. ................. 324/342 |
| 5,469,062 A | 11/1995 | Meyer, Jr. |
| 5,530,359 A | 6/1996 | Habashy |
| 5,552,786 A | 9/1996 | Xia et al. |
| 5,673,050 A | 9/1997 | Moussally et al. |
| 6,098,020 A | 8/2000 | den Boer |
| 6,138,508 A | 10/2000 | Hannan et al. |
| 6,173,773 B1 * | 1/2001 | Almaguer et al. ......... 166/255.2 |
| 6,181,138 B1 | 1/2001 | Hagiwara et al. |
| 6,393,363 B1 | 5/2002 | Wilt et al. |

(Continued)

OTHER PUBLICATIONS

International Search Report and Written Opinion of PCT Application No. PCT/US2010/057403 dated Jul. 28, 2011: pp. 1-7.

*Primary Examiner* — Jermele M Hollington
(74) *Attorney, Agent, or Firm* — Bridget Laffey; Jakub M. Michna (57) ABSTRACT

An apparatus and related methods are described for detecting features of a reservoir surrounding a borehole, the apparatus being capable of emitting an electromagnetic wave signal and receiving a signal representing a response of the reservoir to the electromagnetic wave signal, wherein the emitted signal is a broadband signal selected from within the range of 1 Hz to 1000 Ghz and the received signal includes a directional characteristic to provide an azimuthal determination of the direction of a discontinuity within the formation as the discontinuity reflects or scatters at least part of the broadband signal; azimuthally scanning the surrounding formation; and inverting the received signal for deriving at least a distance of the reflecting discontinuity from the borehole using simultaneous inversion of the reflected or scattered wavefield at multiple frequencies.

22 Claims, 6 Drawing Sheets

(56) References Cited

U.S. PATENT DOCUMENTS

| | | |
|---|---|---|
| 6,525,540 B1 | 2/2003 | Kong et al. |
| 6,755,263 B2 | 6/2004 | Alft et al. |
| 6,864,826 B1 | 3/2005 | Stove |
| 7,259,564 B2 * | 8/2007 | Ligneul et al. .............. 324/337 |
| 7,363,160 B2 | 4/2008 | Seleznev et al. |
| 7,376,514 B2 | 5/2008 | Habashy et al. |
| 7,425,831 B2 | 9/2008 | Banning et al. |
| 7,436,184 B2 * | 10/2008 | Moore .......................... 324/347 |
| 7,557,582 B2 * | 7/2009 | Moore .......................... 324/347 |
| 7,659,722 B2 * | 2/2010 | Bittar ............................ 324/337 |
| 2004/0140091 A1 | 7/2004 | Gupta |
| 2005/0083063 A1 * | 4/2005 | Omeragic et al. ............ 324/338 |
| 2005/0189946 A1 * | 9/2005 | Moore .......................... 324/338 |
| 2005/0189947 A1 * | 9/2005 | Haugland .................... 324/338 |
| 2006/0208738 A1 * | 9/2006 | Moore .......................... 324/344 |
| 2007/0061082 A1 | 3/2007 | Seleznev et al. |
| 2007/0061083 A1 | 3/2007 | Habashy et al. |
| 2008/0284440 A1 * | 11/2008 | Moore .......................... 324/333 |
| 2011/0132082 A1 * | 6/2011 | Pico et al. ..................... 324/346 |

\* cited by examiner

SINGLE WELL RESERVOIR IMAGING APPARATUS AND METHODS

FIELD OF THE INVENTION

This invention relates to apparatus and methods for detecting features in subterranean formations traversed by a borehole using broadband electromagnetic waves to probe the formation.

BACKGROUND

In oil exploration and geophysical surveys, it is useful to provide measuring systems which can detect locations of boundaries between different formations. Examples of applications for such systems include reservoir characterization, geo-steering in directional drilling, salt dome mapping for engineering of gas storage caverns and delineation of hydrocarbon traps, waste disposal control, rock fracture detection in environmental logging, and monitoring of salinity distributions.

The desire to detect such features in the vicinity of boreholes and further away in the formation led to the development of a variety of logging tools. Some of these tools employ sets of antennae for emitting and receiving high frequency electromagnetic waves. By measuring for example the attenuation of the waves, these tools can be used to determine formation properties such as relative permittivity and conductivity and their frequency dependence or dispersion. By fitting the dispersion curves to petrophysical models such as the so-called mixing laws and rock models, it is possible to determine a number of petrophysical parameters related for example to water volume fraction, water DC conductivity, salinity, rock pore and grain system etc.

For the detection of structural features, electromagnetic waves have been used as borehole radar. The electromagnetic wave propagating in the medium can be described by the well-known Maxwell Equations. When the time-related nonlinear effects of the formation, i.e. EM mode conversion and movement related Doppler shift etc., are ignored, the electromagnetic wave propagating and reflected inside the formation can be described by equation [1] below:

$$\nabla^2 \vec{E}(\vec{r}, \omega) = -\omega^2 \mu_0 \mu_r \varepsilon_0 \left( \varepsilon_r(\omega) - i \frac{\sigma(\omega)}{\varepsilon_0 \omega} \right) \vec{E}(\vec{r}, \omega) - i\omega\mu_0\mu_r \vec{J}_0(\vec{r}, \omega) \quad [1]$$

This and similar equations, which neglect the possibilities of EM mode conversion and Doppler shift are used or assumed valid in most of the known radar detection and borehole dielectrics spectroscopy logging methods.

In radar-type detection methods, electromagnetic wave pulses are emitted and reflected from structures which show an impedance contrast to the background medium. The pulses are usually tuned to one or more center frequencies and the receiving signal is filtered by a narrow bandpass filter to remove other frequencies. When reflected from a feature in the formation, the arrival time of the reflected wave is measured and evaluated to determine the distance of the feature from the borehole.

A relatively early example of measuring the dielectric constant through phase shift and attenuation measured at each center frequency to determine subsurface formation parameters is described in the U.S. Pat. No. 3,944,910 to Rau. Further developments of this method can be found for example in the U.S. Pat. No. 4,678,997 to Janes and in the U.S. Pat. No. 5,132,623 to De and Nelson. The U.S. Pat. No. 5,168,234 to Freedman describes further variants of this method, as does the U.S. Pat. No. 5,059,907 to Sherman. More recently, the U.S. Pat. Nos. 7,376,514 to Habashy et al. and 7,363,160 to Seleznev et al. disclose more variants of this method.

Radar methods which depend on determining the arrival time of reflected waves are described in many published documents. For example the U.S. Pat. No. 4,814,768 patent to Chang teaches the use of low-frequency radar pulses to detect reflections from geological discontinuities. Further variants of borehole radar systems are described in the U.S. Pat. No. 4,670,717 to Sender, U.S. Pat. No. 4,297,699 to Fowler et al., U.S. Pat. No. 4,430,653 to Coon and Schafers. More recently, further variants of radar based methods are described in U.S. Pat. No. 5,530,359 to Habashy and Xia, U.S. Pat. No. 5,552,786 to Xia et al. and U.S. Pat. No. 6,525,540 to Kong et al.

An airborne ultra-wide band ground penetrating radar (GPR) system providing non-invasive detection and three-dimensional mapping of underground objects and voids is disclosed in U.S. Pat. No. 5,673,050 to Mousally et al.

In view of the known art, it is seen as one object of the invention to improve and enhance single well logging tools and methods. It is seen as a particular object of the invention to provide novel devices and methods to detect boundaries of objects near and further away from the wellbore using broadband electromagnetic wave signals.

SUMMARY OF INVENTION

According to a first aspect of the present invention, there is provided an apparatus and related methods for imaging parts of a reservoir surrounding a borehole. The apparatus includes at least one transmitter or array of transmitters capable of emitting an electromagnetic wave signal and at least one receiver or an array of receivers to receive a signal representing a response of the reservoir to the electromagnetic wave signal, wherein the transmitter emits a broadband signal from within a range of 1 Hz to 1000 Ghz, more preferably 10 Hz to 100 GHz and the arrangement of transmitter and receiver have a directional characteristic to provide an azimuthal determination of the direction of a discontinuity within the formation with an arrangement of transmitter and receiver mounted such to allow an azimuthally resolved scanning of the surrounding formation. The apparatus comprises output feeds for connecting the receiver to an inversion calculator for deriving at least a distance of the discontinuity from the borehole from a simultaneous inversion of the response at multiple frequencies.

It can therefore been regarded as another aspect of the invention to provide an apparatus for emitting broadband electromagnetic waves into the formation and measuring the reflected broadband signal across the emitted range of frequencies. This process is often referred to as waveform or full waveform inversion to distinguish it from the more common inversion process involves the evaluation of phase shift and attenuation at a single (center) frequency.

The waveform inversion as proposed by the present invention has the additional advantage of being capable of accommodating nonlinear responses of the formation such as mode conversions and Doppler shift. This enables the method to accurately detect even nonlinear dispersing events such as bodies of water moving in the reservoir or accommodate harmonic wave generation by the mode conversion besides scattering and refraction of the incident wave at a discontinuity. It can thus be applied to determine not only important static parameters such as distance, propagation constant, real dielectric constant and/or conductivity with more accuracy but also to extract from the signals dynamic properties such as fluid movement velocity from the measured response of the formation.

To provide a transmitter-receiver (Tx-Rx) arrangement with a azimuthally directional characteristics which can be exploited to scan the surrounding formation, the transmitters and receivers are preferably either offset compared to the center of the borehole axis or include tilted coils attached to a tool mandrel with the whole arrangement being rotatably mounted to generate 360 degrees scans perpendicular to the borehole axis at each measurement point or depth.

The operation frequency (probing frequency) includes preferably the lower part of radio frequency spectrum. To further avoid significant attenuation the present methods and tools are best applied in wells drilled with non-conductive drilling fluids.

A significant part of the spectral signature of an event or reflecting discontinuity can be evaluated with the multi-frequency response signal being preferably distributed and simultaneously inverted within a frequency range of at least 4 decades of the frequency band, more preferably at least 6 decades of that band. The apparatus will preferably emit a sweep of frequencies to excite the nonlinear frequency dispersion of the medium, and detect the signal on the same frequency ranges afterwards. Preferably, features along the whole frequency sweep are examined and inverted.

Using the parameters from the multi-frequency inversion it is possible to determine water saturation maps and salinity maps in a plane around the borehole or in all three dimensions. A pH-sensor can be further incorporated into the tool to measure the local salinity in the borehole. This optional element of the present invention allows for a correction of salinity gained from the dielectric constant using the measured local salinity in the borehole to yield a more accurate measure of the reservoir salinity.

Hence apparatus and related methods in accordance with the various aspects of the invention have several potential applications including remote reservoir water front detection for water flooding or for water coning, clay layer and water layer detection to guide drilling for example within the boundaries of oil-bearing layers, determination of azimuthal 360 degree water saturation, the estimate salinity variation after water injection of water with different salinity, or fracture detection and the determination of the properties of fluids filling a fracture, even in case where the fractures do not intersect with the wellbore. The new methods and tools can be sensitive beyond the 10 cm or 20 cm radius of investigation common to conventional EM-based logging tools.

Further details, examples and aspects of the invention will be described below referring to the following drawings.

DETAILED DESCRIPTION

Figure 1:
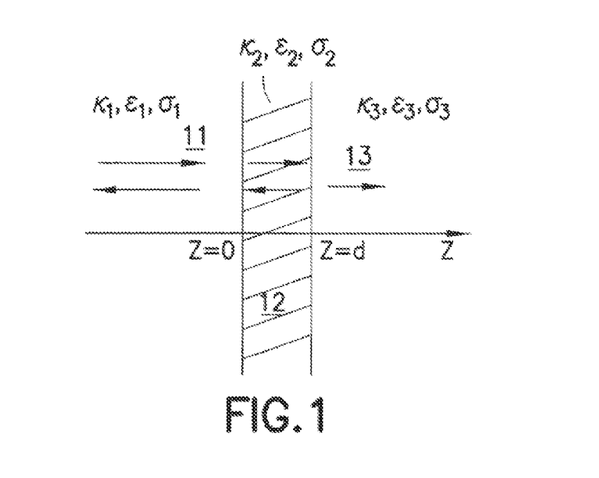
FIG. 1 shows a schematic view of a layer or discontinuity as imaged by an apparatus in accordance with the present invention.

The present example of the invention is illustrated using a modeled interface or discontinuity the plane of which is assumed to extend parallel to the borehole as shown in FIG. 1. The figure illustrates a layered medium with the response of the medium to an electromagnetic wave propagating through it being represented by three properties denoted $k$, $\in$, and $\sigma$. In the present example these properties are propagation constant, real dielectric constant and conductivity, respectively. The properties of the first background medium 11, which represent the conditions in the borehole, are indexed with a subscript 1. The second layer 12 representing for example an oil producing layer of thickness d in parallel with the borehole are indexed with a subscript 2 and the properties of the following layer 13 representing a layer of injected water behind the layer 12 are labeled with 3.

Given these properties, the frequency-dependent reflection and transmission coefficients R, T and phase information of electromagnetic waves propagating in the medium are functions of the formation property, e.g. layer thickness, layer saturation, resistivity and dielectric constant contrast, or distance. One possible way of representing R, T and the complex reflection value is known for example from: Electromagnetic Theory, Julius Adams Stratton, The IEEE Press Series 2007 with the equation 13 of page 512 and the equation 17 of page 513 being reproduced below as equation [2]:

$$\frac{E_1}{E_0} = \frac{r_{12} + r_{23} e^{2ik_2 d}}{1 + r_{12} r_{23} e^{2ik_2 d}} \quad [2]$$

$$\frac{E_3}{E_0} = \frac{1}{(1+Z_{12})(1+Z_{23})} \frac{4 e^{i(k_2 - k_3)d}}{1 + r_{12} r_{23} e^{2ik_2 d}}$$

$$R = \left|\frac{E_1}{E_0}\right|^2$$

$$= \frac{R_{12} + 2\sqrt{R_{12} R_{23}}\, e^{-2\beta_2 d} \cos(\delta_{23} - \delta_{12} + 2\alpha_2 d) + R_{23} e^{-4\beta_2 d}}{1 + 2\sqrt{R_{12} R_{23}}\, e^{-2\beta_2 d} \cos(\delta_{23} + \delta_{12} + 2\alpha_2 d) + R_{12} R_{23} e^{-4\beta_2 d}}$$

-continued $$T = \left|\frac{E_1}{E_0}\right|^2$$

$$= \frac{\mu_3}{\mu_1} \frac{\alpha_1^2 + \beta_1^2}{\alpha_1\alpha_3 + \beta_1\beta_3} **$$

$$\frac{\left(\left[\begin{array}{c}(1-R_{12})(1-R_{23})-\\ 4\sqrt{R_{12}R_{23}}\sin\delta_{12}\sin\delta_{23}\end{array}\right]e^{-2(\beta_2-\beta_3)d}\right)}{\left(\begin{array}{c}1 + 2\sqrt{R_{12}R_{23}}\,e^{-2\beta_2 d}\cos\\ (\delta_{23}+\delta_{12}+2\alpha_2 d) + R_{12}R_{23}e^{-4\beta_2 d}\end{array}\right)}$$

in which $$\sqrt{R_{jk}}\sin\delta_{jk} = \frac{2\mu_j\mu_k(\alpha_k\beta_j - \alpha_j\beta_k)}{(\mu_k\alpha_j + \mu_j\alpha_k)^2 + (\mu_k\beta_j + \mu_j\beta_k)^2}$$

$$1 - R_{jk} = \frac{4\mu_j\mu_k(\alpha_j\alpha_k + \beta_j\beta_k)}{(\mu_k\alpha_j + \mu_j\alpha_k)^2 + (\mu_k\beta_j + \mu_j\beta_k)^2}$$

$$r_{jk} = \frac{\mu_k k_j - \mu_j k_k}{\mu_k k_j + \mu_j k_k}$$

$$R_{jk} = |r_{jk}|^2$$

$$Z_{jk} = \frac{\mu_j}{\mu_k}\sqrt{\frac{\alpha_k^2 + \beta_k^2}{\alpha_j^2 + \beta_j^2}}\,e^{i\gamma_{jk}}$$

$$\tan(\gamma_{jk}) = \frac{\alpha_j\beta_k - \alpha_k\beta_j}{\alpha_j\alpha_k + \beta_k\beta_j}$$

$$k_i^2 = \omega^2\varepsilon_i\mu_i + i\omega\sigma_i\mu_i$$

$$k_i^2 = \alpha_i + i\beta_i$$

The above equation remains valid even when non-linear effects such as mode conversion or Doppler Effect lead to a frequency shift of the reflected or scattered wavefield within the formation. Controlling the inversion to include frequency shifts results in the determination of additional parameters such as fluid velocity inside the formation.

A first application of the new methods and tools is demonstrated using the schematic reservoir of FIG. 1 assuming for example that the middle layer 12 is an oil bearing layer produced through a horizontal well 11, and the layer 13 is the water layer under the oil column. The steps include injecting multi-frequency electromagnetic field from the well 11 into the oil layer 12 and monitoring the electromagnetic wave amplitude variation and phase change from reflections at the interface between layer 12 and the layer 13.

Figure 2:
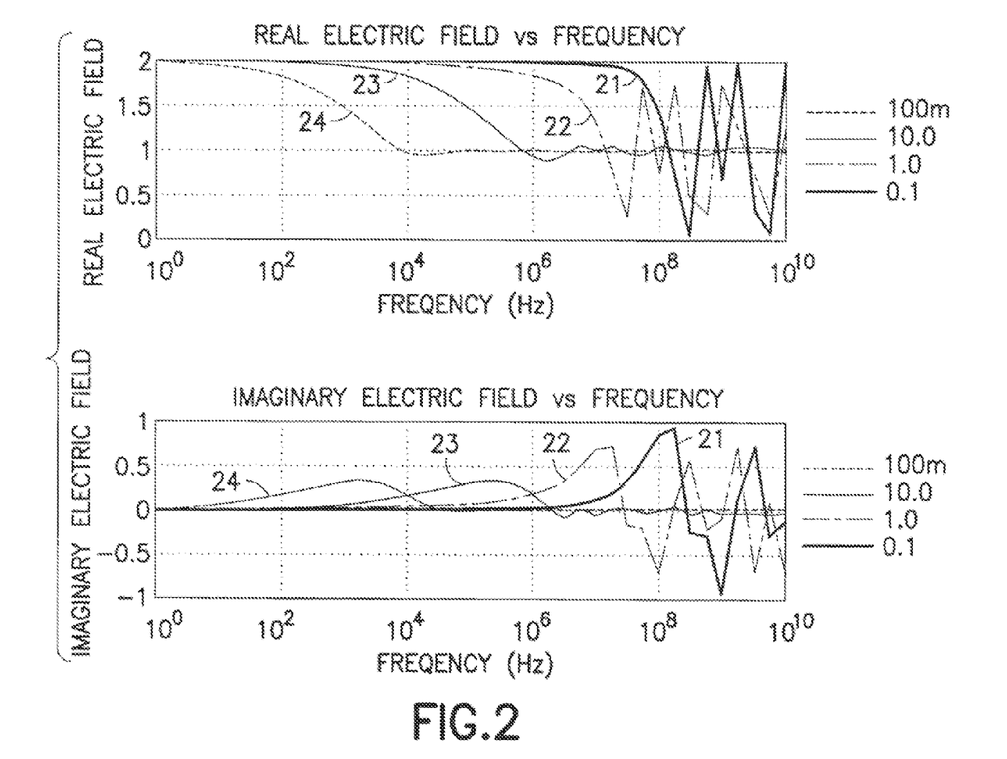
FIG. 2 shows the real and imaginary parts of a reflected multi-frequency electromagnetic wavefield and their sensitivity to the thickness of a discontinuity (oil/water interface) for four different distances ranging from 0.1 m to 100 m.

The plots of FIG. 2 show how the real part of the reflected wave (defined as sum of the emitted and reflected field strength over the emitted field strength) and the imaginary part of the reflected wave changes with frequency for four different layer thicknesses or distance of the oil-water interface (0.1 m (21), 1.0 m (22), 10 m (23) and 100 m (24)). At each of these distances, the reflected field has distinguishable frequency dependence or spectrum. Using waveform inversion techniques which match the measured reflection with the parameters as introduced above for the full bandwidth of measured frequencies, the inversion as represented by eq. [2] can be used to establish a distance parameter d representing the distance d of the reflecting interface or layer.

The model of FIG. 2 can be seen as representing the wavefield signatures of a moving and slowly approaching water front. Thus, the present invention can be applied in a time-lapse manner to monitoring a water front to determine for example the formation sweep caused by water flooding or to detect the water boundary coming from bottom in horizontal well sections or other forms of water coning.

Another possible application of the present invention is the detection of a fracture, even where the fracture is not intersecting the borehole. The maximum distance a fracture can be detected by the present methods and tools is controlled first by the conductivity of the formation, which will attenuate the electromagnetic wave along its path to and from the fracture to the receiver position. This attenuation of electromagnetic waves can be modeled for example as $$e^{\delta z} = e^{\sqrt{\frac{2}{\omega\sigma\varepsilon}}\,z}$$

with z being the propagation axis.

The second effect which determines whether the signal can be detected or not is controlled by the reflection coefficient of electromagnetic wave at the fracture. The reflection coefficient in turn depends on properties of the fracture such as the impedance contrasts between formation and the fluid filling the fracture volume.

Figure 3A:
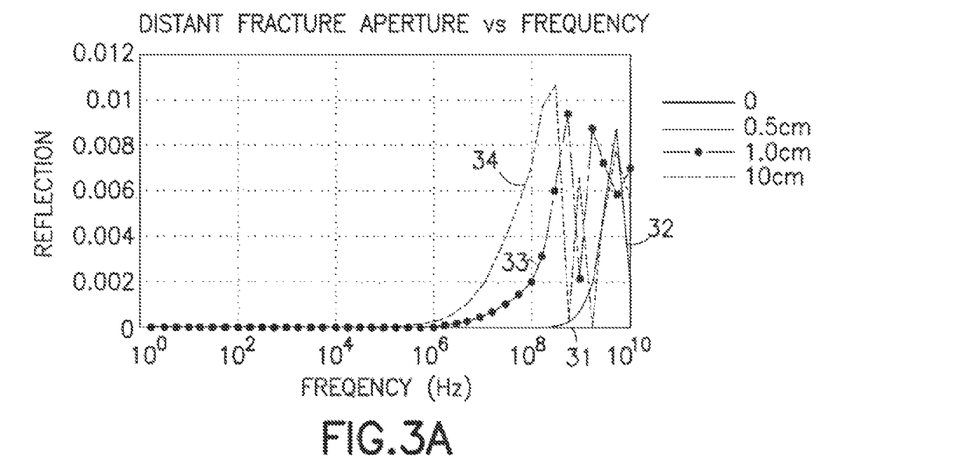
FIG. 3A illustrates the sensitivity of the reflected multi-frequency electromagnetic wavefield to a fracture at a distance of 0.3 m in dependence of the fracture aperture for an oil-filled fracture.
Figure 3B:
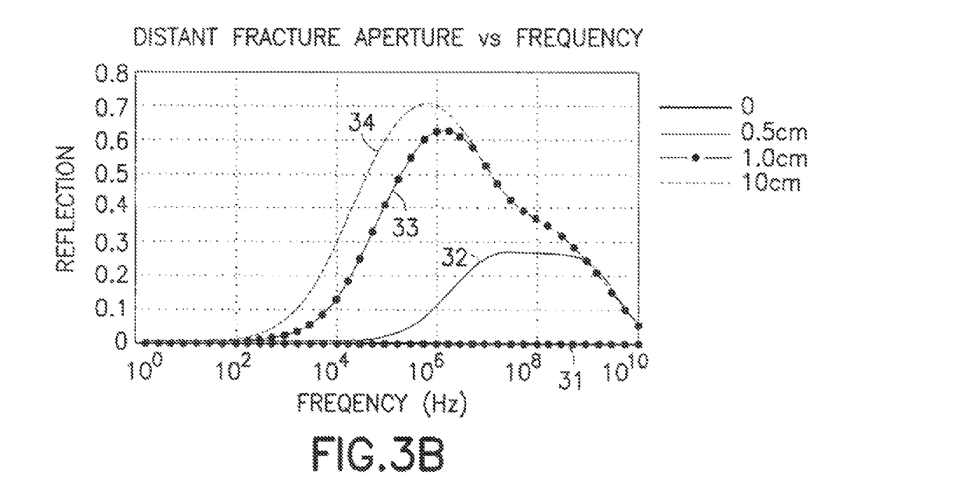
FIG. 3B illustrates the sensitivity of the reflected multi-frequency electromagnetic wavefield to a fracture at a distance of 0.3 m in dependence of the fracture aperture for a water-filled fracture.

As shown in FIG. 3, the fracture aperture can be detected independent of whether the fracture aperture is filled with oil (FIG. 3A) or with water (FIG. 3B) utilizing in both cases the reflection characteristics of multi-frequency electro-magnetic waves and a waveform inversion. In both examples, the fracture is assumed to be located 0.3 m from the well resulting in a corresponding attenuation of the wavefield. The curves shown illustrate the expected reflected amplitude of the wave for four different apertures of the fracture (0 cm (31), 0.5 cm (32), 1.0 cm (33), and 10 cm (34)). However the inversion can yield distance by matching the attenuation and aperture of a fracture by matching the frequency characteristics of the reflection simultaneously.

The methods and tools of the present invention are sensitive to contrasts in the dielectric properties of the subsurface materials. Thus it is also in principle possible to detect other interfaces like those between clay and other rock minerals or between water and oil saturated layers. By integrating a tool in accordance with the present invention into a drilling device this sensitivity can be used to guide the drilling with respect to a clay layer or water filled layer applying otherwise standard Logging-While-Drilling (LWD) methods. Such a tool would be useful for drilling for example long horizontal wells while following the contours of a cap rock layer.

Figure 4:
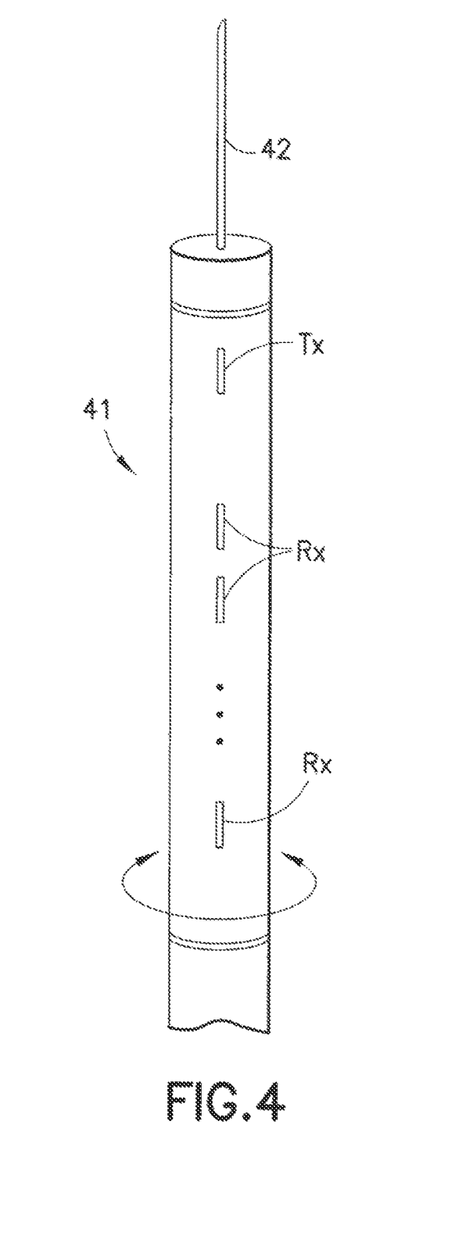
FIG. 4 shows antenna elements of a transmitter-receiver arrangement mounted on a tool body.

A schematic arrangement of elements within a device in accordance with an example of the present invention is shown in FIG. 4. Typically a device in accordance with the invention will carry at least one transmitter and one receiver element on a tool body which can be operated under downhole conditions. The device of FIG. 4 has a transmitter element Tx which can emit a narrowband electromagnetic signal sweeping through a range of frequency. The response of formation to this signal is registered by an array of receiver elements Rx. The response registration procedure is preferably following an excitation-measure cycle, to accommodate frequency shifts from previous launched frequencies, rather than a frequency by frequency monitoring cycle. Both elements can be antennas or coils, and can be arranged either aligned with the tool axis or tilted to give it an azimuthally focused emission or receiving characteristics.

The arrangement is mounted on a rotatable part 41, which can be rotated around the tool axis. A cable 42 (or any other conveyance device such as coiled tubing) connects the power supply and control systems of the elements Tx and Rx to a surface location (not shown). In case that the on-board processing systems have insufficient computational power to perform the evaluation of the received signals downhole or in order to store or distribute the signals, the cable 42 can be connected to signal and data processing facilities on the surface. A real-time evaluation or inversion performed either downhole or at a surface location allows for applications such as geosteering.

To reduce the attenuating effects the fluid filling the well has on the measurement, it can be envisaged to bring the transmitter and receiver elements as close as possible to the formation. Following known approaches, this can be achieved by designing the tool with an appropriately extended diameter to closely match the diameter of the well or by resorting to a cantilevered structure which pushes the tool against the wall of the well before emitting and receiving signals.

The transmitter and receiver elements applied are considered to be multi-frequency or broadband if they allow the measurement or determination of representatives of the energy or amplitude and of the phase of an electromagnetic signal emitted at a plurality of frequencies. As described above in the example above, the multi-frequency or broadband emission and reflection required by the present invention can be generated by scanning or sweeping through the frequency range in what is effectively a series of frequency-shifted narrowband measurements. The general frequency range envisaged by the present invention is large and ranges from several hertz to hundreds of gigahertz.

The frequency range selection is best selected such that the polarization mechanism inside the formation remains unchanged throughout. This assumption facilitates the multi-frequency inversion. In the frequency range of interest, there are mainly two polarization mechanisms: charge transport and microwave polarization. Although co-existing, charge transport gradually dominants as frequency goes to the lower end while microwave polarization dominants in the other end of frequency range. Practical operating frequencies may be for example a frequency sweep from $10^{}6$ to $10^{}10$ Hz or from $10^{}4$ to $10^{}8$ Hz.

Figure 5:
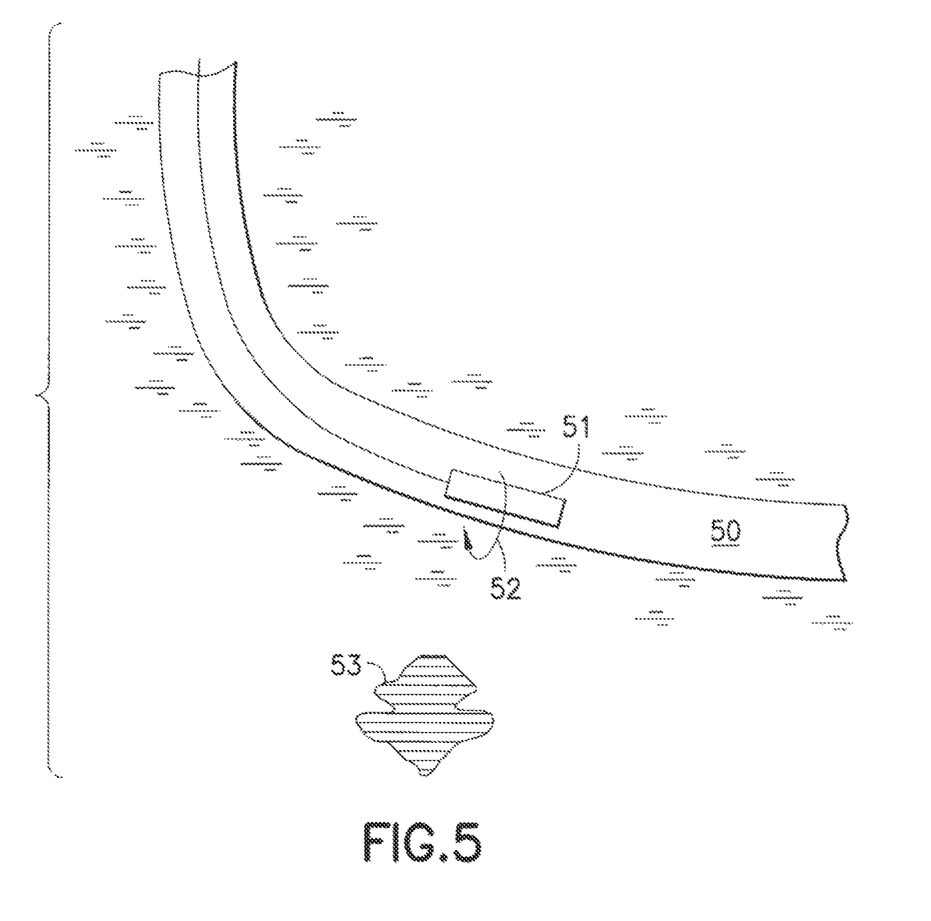
FIG. 5 shows a tool in accordance with an example of the invention in a schematic borehole environment.

The measured signals are fed into an inversion processor (54) which is either on-board within the tool body or located remotely. During the inversion process, measurements on all frequencies are typically examined to locate the reflection peaks in real and imaginary reflection coefficients. The position of the reflection peaks and their amplitudes are a function of formation properties (like dielectric constant, conductivity, water saturation etc.) and geometries (distance to the boundaries etc). Least-square regression methods, or Monte-Carlo simulations are best used to invert the measurements for the selected parameters.

Apart from their multi-frequency characteristics, the invention uses a non-uniform emission or receiving characteristics exploited for multi-azimuthal emission and/or reception. This characteristic enables a determination of the direction of the received multi-frequency signals. In the example the multi-azimuthal characteristic of the transmitter-receiver arrangement is based on a rotatable asymmetric arrangement of either transmitter Tx or receiver elements Rx using for example the methods and apparatus as described in U.S. Pat. No. 6,173,773 to J. Almaguer. Alternatively, a multi-element arrangement of antennae distributed along the circumference of the device can be used with each of the elements being active in a manner which allows for azimuthally resolved measurements. Such arrangements are often referred to as schedule controlled or round-robin feed and are known in principle.

A schematic application of the device of FIG. 4 is illustrated in FIG. 5, in which the device 51 is shown located in a well 50. The arrow 52 indicates a rotational movement of the antenna arrangement around the tool axis. At a distance from the well 50, there is shown a body of salt water 53 embedded within the formation but without intersecting with the well 50.

Figure 6:
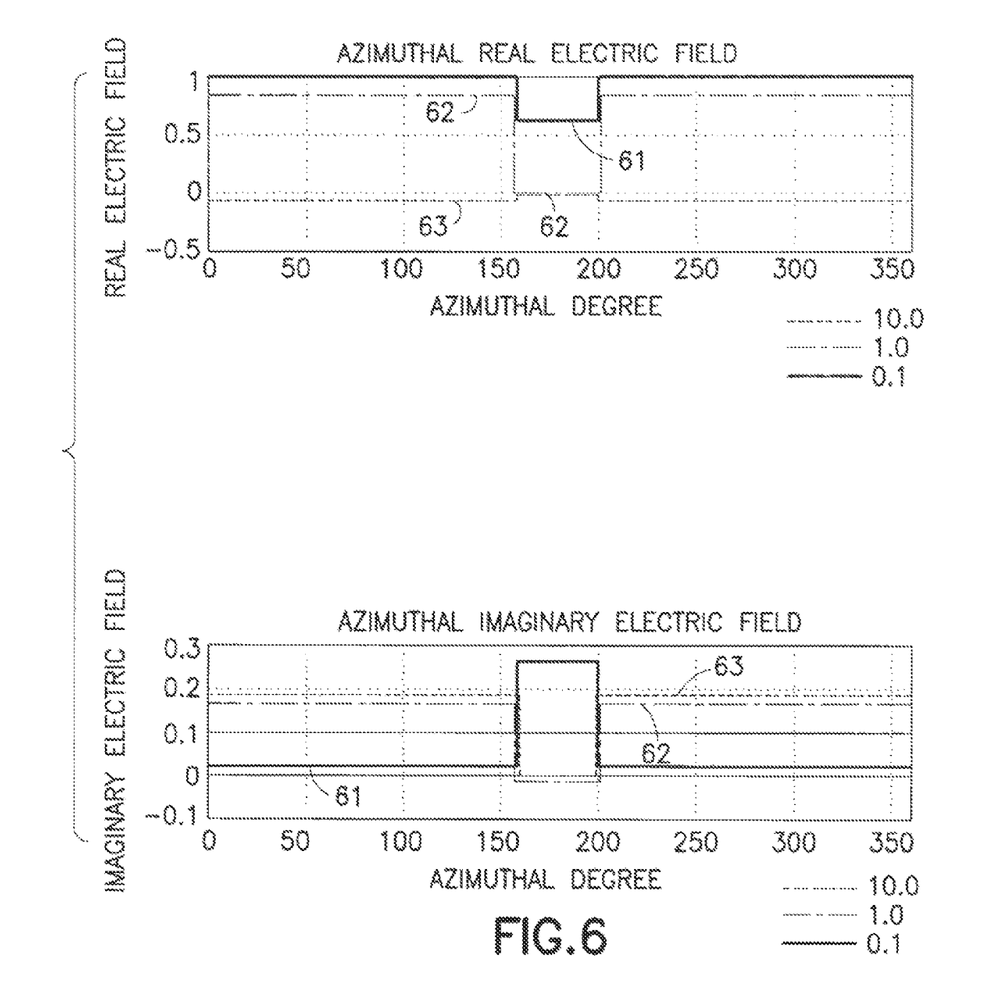
FIG. 6 illustrates the expected response of the dielectric constant, real part and conductivity signal response to body of water as shown in FIG. 5 for three different distances from the borehole.

The azimuthal response such a body or water 53 generates is shown in FIG. 6. in a form of the real and imaginary part of the electrical field in dependence of the azimuth for three different distances (0.1 m (61), 1 m (62) and 10 m (63)) of the body 53 of water from the well 50. The change in the signal clearly indicates the presence of the body of water 53 between 160 and 200 degrees. When the Tx-Rx pair is pointing away from the water body, e.g. looking at a 0-160 and 200-360 degrees azimuth, the reflected electromagnetic field is essentially constant since only homogeneous background formation is scanned. At an azimuth of 160-200 degrees, however, the reflected wave clearly indicates presence of the body of water 53.

When an application such as geosteering requires knowledge of the absolute direction of the detected body of water or layer boundary, it is seen as useful to further combine the device as described above with any of the known instruments or sensors sensitive to the absolute orientation of a tool in the well. Such instruments can be inclinometer, magnetometer or accelerometer.

Figure 7:
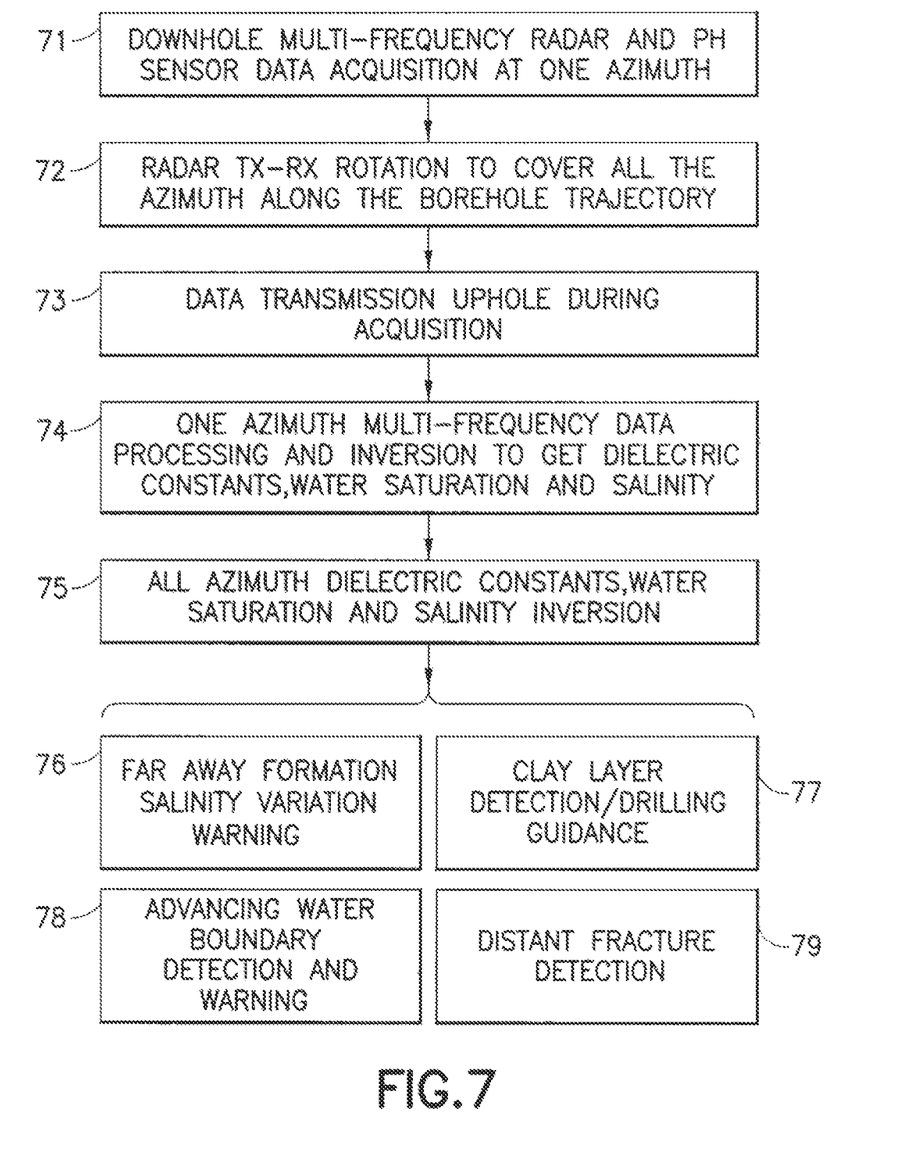
FIG. 7 shows a flow chart of acquisition, processing and inversion steps to determine various parameters of interest using methods and tools in accordance with the present invention.

The above described steps of operating an apparatus in accordance with the present inventions are summarized in the flowchart of FIG. 7. The flowchart includes the steps of making a radar-like measurement of a multi-frequency signal, except that instead of frequency-by frequency measure and process, a whole range frequency measurement and processing is needed (Step 71) and repeating that measurement over a plurality of different azimuth along the trajectory of the well (step 72). After transmitting data representing the measured signals to the surface (Step 73), they are processed (Step 74) and inverted to gain dielectric constants, distances, fluid velocities (Doppler shifts), saturations, salinities, etc. and their azimuthal coordinate (Step 75) using for example weighted least-square inversion and multiple line-search methods. From these evaluations, it is possible to gain advance warning of water boundaries, of clay boundaries, salinity changes or to detect distant fractures (Steps 76, 77, 78 and 79 respectively).

The results of the inversion provide an azimuthal water saturation map around the borehole, preferably in meter scale, depending on the frequency selected. Results can also be combined with VSP data to derive other petrophysical and geometrical parameters.

Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. An apparatus for detecting features of a subterranean formation surrounding a borehole, said apparatus comprising
at least one transmitter to emit an electromagnetic wave signal and at least one receiver to receive a signal representing a response of said formation to said electromagnetic wave signal, wherein said at least one transmitter emits a broadband signal from within the range of 1 Hz to 1000 Ghz and said at least one transmitter and said at least one receiver combined have a directional characteristic to provide an azimuthal determination of the direction of a discontinuity within said formation as said discontinuity reflects or scatters at least part of said broadband signal and wherein said at least one transmitter and said at least one receiver are mounted on a tool body to allow an azimuthally resolved scanning of said surrounding formation; and further comprising output feeds for connecting said at least one transmitter and said at least one receiver to an inversion processor for deriving at least a distance of said reflecting discontinuity from the borehole from a simultaneous inversion of a reflected wavefield at multiple frequencies.

2. The apparatus of claim 1, wherein the inversion processor is configured to include a non-linear frequency response of the formation to the electromagnetic wave signal.

3. The apparatus of claim 1, having a transmitter and/or receiver arrangement rotatable mounted on the tool body.

4. The apparatus of claim 1, having a plurality of transmitter and/or receiver arrangements arranged around the circumference of the tool body.

5. The apparatus of claim 1, wherein the emitted signals has significant output at frequencies spread across at least 4 orders of magnitude within the electromagnetic frequency spectrum.

6. The apparatus of claim 1, wherein the multi-frequency inversion is inverting frequencies spread across at least 4 orders of magnitude within the electromagnetic frequency spectrum.

7. The apparatus of claim 1, wherein the inversion processor is designed to perform a waveform inversion.

8. The apparatus of claim 1, wherein the inversion processor provides any or all of azimuthal direction, radial distance from the borehole and aperture of a fracture.

9. The apparatus of claim 1, wherein the inversion processor provides any or all of azimuthal direction, radial distance from the borehole of a body of water.

10. The apparatus of claim 1, wherein the inversion processor provides control signals to geo-steer a drilling tool relative to the discontinuities.

11. The apparatus of claim 1, wherein the inversion processor provides azimuthally resolved water saturations at a distance from the well.

12. A method for detecting features of a reservoir surrounding a borehole, said method comprising the steps of emitting an electromagnetic wave signal and receiving a signal representing a response of said reservoir to said electromagnetic wave signal, wherein said emitted signal is a broadband signal from within the range of 1 Hz to 1000 Ghz and the received signal includes a directional characteristic to provide an azimuthal determination of the direction of a discontinuity within the formation as said discontinuity reflects at least part of said broadband signal;

scanning azimuthally the surrounding formation; and inverting the received signal for deriving at least a distance of said reflecting discontinuity from the borehole using simultaneous inversion of a reflected wavefield at multiple frequencies.

13. The method of claim 12, wherein the inversion includes a possible non-linear frequency response of the formation to the electromagnetic wave signal.

14. The method of claim 12, including the step of rotating in the borehole a transmitter and/or receiver arrangement for the electromagnetic signals.

15. The method of claim 12, wherein the emitted signals has significant output at frequencies spread across at least 4 orders of magnitude within the electromagnetic frequency spectrum.

16. The method of claim 12, wherein the multi-frequency inversion is inverting frequencies spread across at least 4 orders of magnitude within the electromagnetic frequency spectrum.

17. The method of claim 13, wherein the inversion is designed to a full waveform inversion.

18. The method of claim 12, further comprising the step of performing the inversion to provide any or all of azimuthal direction, radial distance from the borehole and aperture of a fracture.

19. The method of claim 12, further comprising the step of performing the inversion to provide any or all of azimuthal direction, radial distance from the borehole and aperture of a fracture not crossing the borehole.

20. The method of claim 12, further comprising the step of performing the inversion to provide any or all of azimuthal direction, radial distance from the borehole of a body of water.

21. The method of claim 12, further comprising the step of performing the inversion to provide control signals to geo-steer a drilling tool relative to the discontinuities.

22. The method of claim 12, further comprising the step of performing the inversion to provide azimuthally resolved water saturations at a distance from the well.

* * * * *